United States Patent
Liaw et al.

(10) Patent No.: US 9,846,945 B2
(45) Date of Patent: Dec. 19, 2017

(54) METHOD FOR GENERATING ORIENTATION IMAGE

(71) Applicant: Altek Autotronics Corporation, Hsinchu (TW)

(72) Inventors: Ming-Jiun Liaw, Miaoli County (TW); Chao-Yi Lin, Hsinchu County (TW)

(73) Assignee: Altek Autotronics Corporation, Hsinchu (TW)

( * ) Notice: Subject to any disclaimer, the term of this patent is extended or adjusted under 35 U.S.C. 154(b) by 599 days.

(21) Appl. No.: 14/469,594

(22) Filed: Aug. 27, 2014

(65) Prior Publication Data

US 2016/0026887 A1    Jan. 28, 2016

(30) Foreign Application Priority Data

Jul. 25, 2014 (TW) .............................. 103125530 A (51) Int. Cl.
  *G06K 9/32* (2006.01)
  *G06T 7/00* (2017.01)
  *G06T 7/13* (2017.01)

(52) U.S. Cl.
  CPC .............. *G06T 7/0085* (2013.01); *G06K 9/32* (2013.01); *G06T 7/13* (2017.01)

(58) Field of Classification Search
  CPC .... G06K 9/3275; G06K 2209/27; G06K 9/46; G06K 9/4642; G06K 9/66; G06K 9/4604; G06K 9/00067; G06K 9/00711; G06K 9/00295; G06K 9/00744; G06K 9/6232; G06K 9/00248; G06K 9/00281; G06K 9/00228; G06K 9/00597; G06K 2009/363; G06K 2209/01; G06K 9/00463; G06K 9/3233; G06K 9/38; G06K 9/00986; G06K 9/4609; G06K 9/32; G06K 2209/011;
  (Continued)

(56) References Cited

U.S. PATENT DOCUMENTS 7,043,082 B2 * 5/2006 Larkin ............... G06K 9/00067
                                                          382/210
2001/0024311 A1 * 9/2001 Larkin ............... G06K 9/00067
                                                          359/237
(Continued)

FOREIGN PATENT DOCUMENTS

| CN | 101551576 | 10/2009 |
| CN | 102722469 | 10/2012 |
| TW | 201131513 | 9/2011 |

*Primary Examiner* — Aklilu Woldemariam
(74) *Attorney, Agent, or Firm* — Jianq Chyun IP Office (57) ABSTRACT

A method for generating an orientation image, adapted to an electronic device, includes the following steps. A plurality of input pixels including a current input pixel of an input image is received. Edge detection is performed on the current input pixel in a first and second direction to generate a first current gradient and a second current gradient respectively with respect to the first direction and the second direction. A ratio of the first current gradient to a current gradient absolute sum is calculated to obtain a current ratio, where the current gradient absolute sum is a sum of absolute values of the first and second current gradient. A sign of the second current gradient is extracted to obtain a current sign. The current ratio and the current sign are inputted to a lookup table to obtain an image orientation angle corresponding to the current input pixel.

9 Claims, 6 Drawing Sheets

(58) Field of Classification Search
CPC ........... G06K 2209/013; G06K 9/3208; G06K 9/6821; G06T 3/60; G06T 2207/10148; G06T 7/571; G06T 2207/20192; G06T 7/13; G06T 7/0085; G06T 2207/10012; G06T 7/55; G06T 7/70; G06T 7/80; G06T 5/002; G06T 5/20; G06T 7/001; G06T 2207/10016; G06T 2207/30201; G06T 7/00; G06T 3/608; G06T 2207/20056; G06T 2207/30016; G06T 7/0012; G06T 7/33; G06T 7/38; H04N 7/183; H04N 13/0221; H04N 1/4092; H04N 1/58; H04N 1/2112; H04N 2201/0084; H04N 13/0239; H04N 13/0242; G11B 27/28; G06F 17/30112; G06F 17/30256; G06F 17/3087; G06F 15/8023; G06F 15/8038; G01B 11/00; G01S 5/163; G01R 33/50; G01R 33/5601; G01T 1/1603; G03H 2001/2242
USPC ....... 382/289, 254, 296, 199, 170, 144, 275, 382/128
See application file for complete search history.

(56) References Cited

U.S. PATENT DOCUMENTS

| | | | |
|---|---|---|---|
| 2004/0190787 A1* | 9/2004 | Nakami | H04N 1/58 382/260 |
| 2005/0168657 A1* | 8/2005 | Neuman | H04N 7/012 348/700 |
| 2006/0233460 A1* | 10/2006 | Kondo | G06T 3/403 382/276 |
| 2008/0310731 A1* | 12/2008 | Stojancic | G06K 9/00711 382/195 |
| 2009/0238440 A1* | 9/2009 | Faivishevsky | G06K 9/4604 382/144 |
| 2010/0054595 A1* | 3/2010 | Demandolx | G06K 9/3275 382/170 |
| 2010/0125442 A1* | 5/2010 | Hatanaka | G06F 17/5036 703/14 |
| 2010/0134688 A1* | 6/2010 | Moriwake | G06K 9/00228 348/586 |
| 2010/0293173 A1* | 11/2010 | Chapin | G06F 17/3087 707/759 |
| 2011/0134136 A1* | 6/2011 | Seiler | G06T 5/002 345/582 |
| 2014/0028842 A1* | 1/2014 | Abramson | H04N 7/18 348/143 |
| 2015/0125092 A1* | 5/2015 | Zhuo | G06T 5/002 382/275 |
| 2015/0146994 A1* | 5/2015 | Arnison | G06T 7/571 382/254 |
| 2015/0206022 A1* | 7/2015 | Radha Krishna Rao | G06K 9/4604 382/128 |
| 2015/0213059 A1* | 7/2015 | Ely | G06F 17/30256 382/103 |

* cited by examiner

METHOD FOR GENERATING ORIENTATION IMAGE

CROSS-REFERENCE TO RELATED APPLICATION

This application claims the priority benefit of Taiwan application serial no. 103125530, filed on Jul. 25, 2014. The entirety of the above-mentioned patent application is hereby incorporated by reference herein and made a part of this specification.

BACKGROUND OF THE INVENTION

1. Field of the Invention

The present invention generally relates to an image processing technique, in particular, to a method for generating an orientation image.

2. Description of Related Art

Edge detection is a critical pre-processing step of object detection in the field of computer vision and image processing. The term "edge" is referred to as a set of neighboring pixels with sharp variation in an image, i.e. regions with discontinuous and rough neighboring pixels. In general, after edge detection is performed on an image in a horizontal and a vertical direction, a gradient intensity and a gradient orientation of each pixel may be accordingly calculated. Thus, image feature extraction may be performed in a follow-up process through, for example, a histogram of oriented gradient (HoG) technique so as to detect an object in the image.

However, given a horizontal gradient Gx and a vertical gradient Gy of a pixel, efficient execution or sufficient memory space is required. For example, to obtain a gradient orientation of the pixel via an arcsine lookup table approach, it is necessary to compute the term $$\frac{Gx}{\sqrt{Gx^2 + Gy^2}},$$

and yet a square-root computation is expensive for a low-cost chip. On the other hand, to obtain the gradient orientation via an arctangent lookup table approach, since the value of $$\frac{Gy}{Gx}$$

ranges between $-\infty$ and $+\infty$, an arctangent lookup table may not provide enough coverage for all inputs. Additionally, to obtain the gradient orientation via a two-dimensional arctangent lookup table approach such that the lookup table is constructed based on positive and negative signs of horizontal gradients Gx and vertical gradients Gy as well as $$\frac{Gy}{Gx},$$

large memory space is required for storing such two-dimensional lookup table. The two-dimensional lookup table may be unfavorable to be loaded into an on-chip memory for real-time computation.

SUMMARY OF THE INVENTION

Accordingly, the invention is directed to a method for generating an orientation image, where an orientation image associated with an input image may be generated precisely in real time with low-cost implementation.

The invention is directed to a method for generating an orientation image, adapted to an electronic device, where the orientation image includes a plurality of image orientation angles, and each of the image orientation angles ranges between 0 and $2\pi$ or between 0 and 360°. The method includes the following steps. First, a plurality of input pixels of an input image are received, where the input pixels include a current input pixel. Edge detection is performed on the current input pixel in a first direction and a second direction so as to respectively generate a first current gradient and a second current gradient with respect to the first direction and the second direction. A ratio of the first current gradient to a current gradient absolute sum is calculated so as to obtain a current ratio, where the current gradient absolute sum is a sum of an absolute value of the first current gradient and an absolute value of the second current gradient. A sign of the second current gradient is extracted so as to obtain a current sign. The current ratio and the current sign are input to a lookup table so as to obtain the image orientation angle corresponding to the current input pixel.

According to an embodiment of the invention, the method for constructing the lookup table includes the following steps. A plurality of first components having positive signs, negative signs, and zeros as well as a plurality of second components having positive signs, negative signs, and zeros are provided. For each set formed by any one of the first components and any one of the second components: a first ratio corresponding to the first component is calculated, where the first ratio is equal to the first component divided by a square root of a sum of squares of the first component and the second component; a sign of the second component is extracted so as to obtain a reference sign; an orientation angle is calculated by using an arccosine function or an arcsine function according to the first ratio and the reference sign, where the orientation angle ranges between 0 and $2\pi$ or between 0 and 360°; a second ratio corresponding to the first component is calculated, where the second ratio is equal to the first component divided by a sum of an absolute value of the first component and an absolute value of the second component; and the lookup table is constructed according to the second ratio, the reference sign, and the orientation angle, where inputs of the lookup table are the second ratio and the reference sign, and where an output of the lookup table is the orientation angle.

According to an embodiment of the invention, the first direction is orthogonal to the second direction.

The invention is directed to a method for generating an orientation image, adapted to an electronic device, where the orientation image includes a plurality of image orientation angles, and each of the image orientation angles ranges between 0 and $\pi$ or between 0 and 180°. The method includes the following steps. First, a plurality of input pixels of an input image are received, where the input pixels include a current input pixel. Edge detection is performed on the current input pixel in a first direction and a second direction so as to respectively generate a first current gradient and a second current gradient with respect to the first direction and the second direction. A ratio of the first current gradient to a current gradient absolute sum is calculated so as to obtain a current ratio, where the current gradient absolute sum is a sum of an absolute value of the first current gradient and an absolute value of the second current gradient. The current ratio is input to a lookup table so as to obtain the image orientation angle corresponding to the current input pixel.

According to an embodiment of the invention, the method for constructing the lookup table includes the following steps. A plurality of first components having positive signs, negative signs, and zeros as well as a plurality of second components having positive signs, negative signs, and zeros are provided. For each set formed by any one of the first components and any one of the second components: a first ratio corresponding to the first component is calculated, where the first ratio is equal to the first component divided by a square root of a sum of squares of the first component and the second component; an orientation angle is calculated by using an arccosine function or an arcsine function according to the first ratio and the reference sign, where the orientation angle ranges between 0 and $\pi$ or between 0 and 180°; a second ratio corresponding to the first component is calculated, where the second ratio is equal to the first component divided by a sum of an absolute value of the first component and an absolute value of the second component; and the lookup table is constructed according to the second ratio and the orientation angle, where an input of the lookup table is the second ratio, and where an output of the lookup table is the orientation angle.

According to an embodiment of the invention, the first direction is orthogonal to the second direction.

The present invention is directed to a method for generating an orientation image, adapted to an electronic device, where the orientation image includes a plurality of image orientation angles, and each of the image orientation angles ranges between 0 and $\pi/4$ or between 0 and 90°. The method includes the following steps. First, a plurality of input pixels of an input image are received, where the input pixels include a current input pixel. Edge detection is performed on the current input pixel in a first direction and a second direction so as to respectively generate a first current gradient and a second current gradient with respect to the first direction and the second direction. A ratio of an absolute value of the first current gradient to a current gradient absolute sum is calculated so as to obtain a current ratio, where the current gradient absolute sum is a sum of an absolute value of the first current gradient and an absolute value of the second current gradient. The current ratio is input to a lookup table so as to obtain the image orientation angle corresponding to the current input pixel.

According to an embodiment of the invention, the method for constructing the lookup table includes the following steps. A plurality of first components having positive signs and zeros as well as a plurality of second components having positive signs and zeros are provided. For each set formed by any one of the first components and any one of the second components: a first ratio corresponding to the first component is calculated, where the first ratio is equal to the first component divided by a square root of a sum of squares of the first component and the second component; an orientation angle is calculated by using an arccosine function or an arcsine function according to the first ratio and the reference sign, where the orientation angle ranges between 0 and $\pi/4$ or between 0 and 90°; a second ratio corresponding to the first component is calculated, where the second ratio is equal to the first component divided by a sum of an absolute value of the first component and an absolute value of the second component; and the lookup table is constructed according to the second ratio and the orientation angle, where an input of the lookup table is the second ratio, and where an output of the lookup table is the orientation angle.

According to an embodiment of the invention, the first direction is orthogonal to the second direction.

To sum up, in the method of the invention for generating an orientation image, a lookup table mathematically equivalent to an arcsine lookup table or an arccosine lookup table is prestored in an electronic device, where large memory space is not a requirement. After an input image is received and a first and a second current gradient of each input pixels are obtained through edge detection, a square-root and a square computation requiring high processing cost are replaced by an absolute computation, and an orientation image may be obtained by using the aforementioned lookup table. Accordingly, while generating a precise orientation image, the applicability of the technique proposed in the invention is increased in practical application especially for consumer electronic products integrated with a low-cost chip having a real-time computational capability.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Given a horizontal gradient Gx and a vertical gradient Gy of a pixel, in order to obtain a gradient orientation of the pixel via an arcsine lookup table approach, it is a necessity to compute the term $$\frac{Gx}{\sqrt{Gx^2 + Gy^2}},$$

and yet a square-root computation is relatively expensive for a low-cost chip. The main concept of the invention is to perform an absolute computation (|Gx|+|Gy|) with lower computational cost instead of a square-root and a square computation ($\sqrt{Gx^2+Gy^2}$) with higher computational cost as well as to pre-construct a lookup table mathematically equivalent to an arcsine lookup table or an arccosine lookup table, and thus an orientation image of an input image may be obtained precisely in real-time.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the invention.

Figure 1:
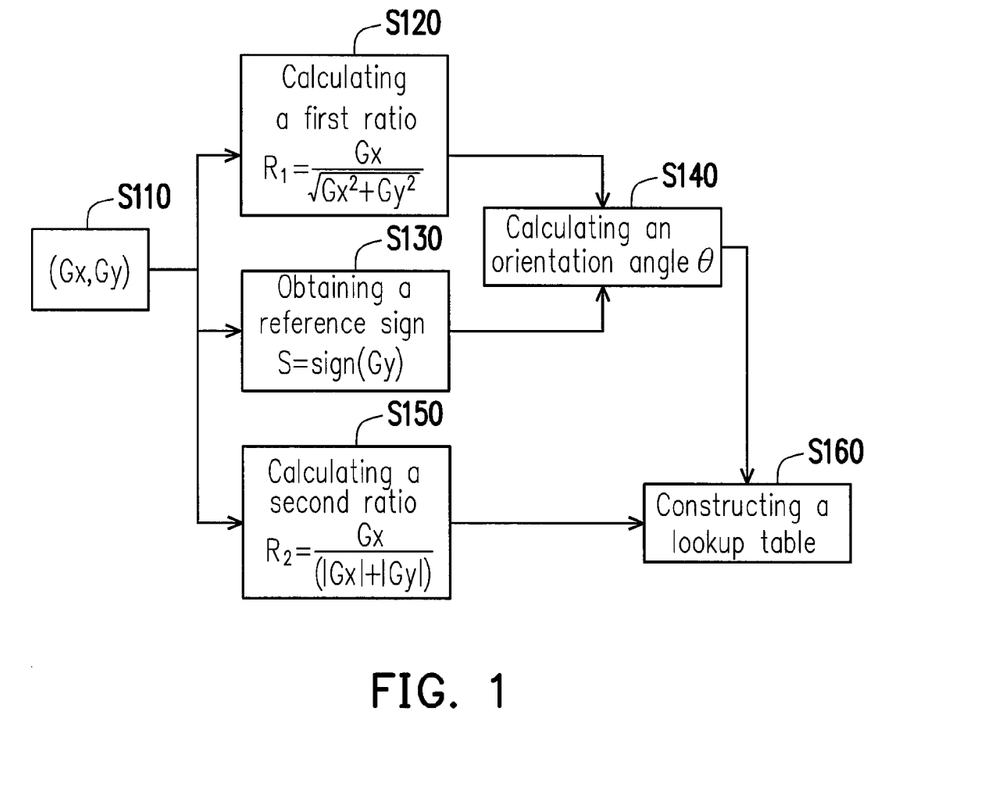
FIG. 1 illustrates a flowchart of a method for constructing a lookup table of an orientation image according to an embodiment of the invention.

FIG. 1 illustrates a flowchart of a method for constructing a lookup table of an orientation image according to an embodiment of the invention. The lookup table herein is mathematically equivalent to an arcsine lookup table or an arccosine lookup table and is adapted to generate an orientation image with orientation angles ranging between 0 and $2\pi$ or between 0 and 360°.

Referring to FIG. 1, in Step S110, a plurality of first components with respect to a first direction and having positive signs, negative signs, and zeros as well as a plurality of second components with respect to a second direction and having positive signs, negative signs, and zeros are provided. In the present embodiment, the first direction is orthogonal to the second direction. In other words, each of the first components is a horizontal component Gx, and each of the second components is a vertical component Gy. The precision of the lookup table is determined by the number of the first components and the second components.

Next, the following steps may be performed on each set (Gx, Gy) formed by any one of the first components and any one of the second components. In Step S120, a first ratio corresponding to the first component is calculated, where the first ratio is equal to the first component divided by a square root of a sum of squares of the first component and the second component and may be written as Eq. (1.1):

$$R_1 = \frac{Gx}{\sqrt{Gx^2 + Gy^2}} \qquad \text{Eq. (1.1)}$$

where $R_1$ represents the first ratio. Since the lookup table in the present embodiment is adapted to generate an orientation image with orientation angles ranging between 0 and $2\pi$ or between 0 and 360°, in Step S130, a sign of the second component is extracted so as to obtain a reference sign, where the reference sign S may be written as Eq. (1.2):

$$S = \text{sign}(Gy) \qquad \text{Eq. (1.2)}$$

Next, in Step S140, an orientation angle is calculated by using an arccosine function or an arcsine function according to the first ratio and the reference sign respectively obtained in Step S120 and Step S130. In other words, after arccos($R_1$) or arcsin($R_1$) is calculated, the orientation angle $\theta$ may be obtained according to the reference sign S. Since the first component is set to the horizontal component Gx, the orientation angle $\theta$ may be obtained by using the arcsine function arcsin($R_1$) in conjunction with the orientation angle $\theta$.

Moreover, in Step S150, a second ratio corresponding to the first component is calculated, where the second ratio is equal to the first component divided by a sum of an absolute value of the first component and an absolute value of the second component and may be written as Eq. (1.3):

$$R_2 = \frac{Gx}{(|Gx| + |Gy|)} \qquad \text{Eq. (1.3)}$$

where $R_2$ represents the second ratio.

In Step S160, the lookup table is constructed according to the second ratio, the reference sign, and the orientation angle computed in Step S140, where inputs of the lookup table are the second ratio and the reference sign, and an output of the lookup table is the orientation angle. Since the function for calculating the first ratio $R_1$ $$\left(\text{i.e. } \frac{Gx}{\sqrt{Gx^2 + Gy^2}}\right)$$

and the function for calculating the second ratio $R_2$ $$\left(\text{i.e. } \frac{Gx}{(|Gx| + |Gy|)}\right)$$

are both injective functions, the lookup table constructed in Step S160 is mathematically equivalent to the arcsine lookup table constructed based on the first ratio, the reference sign, and the orientation angle.

Figure 2:
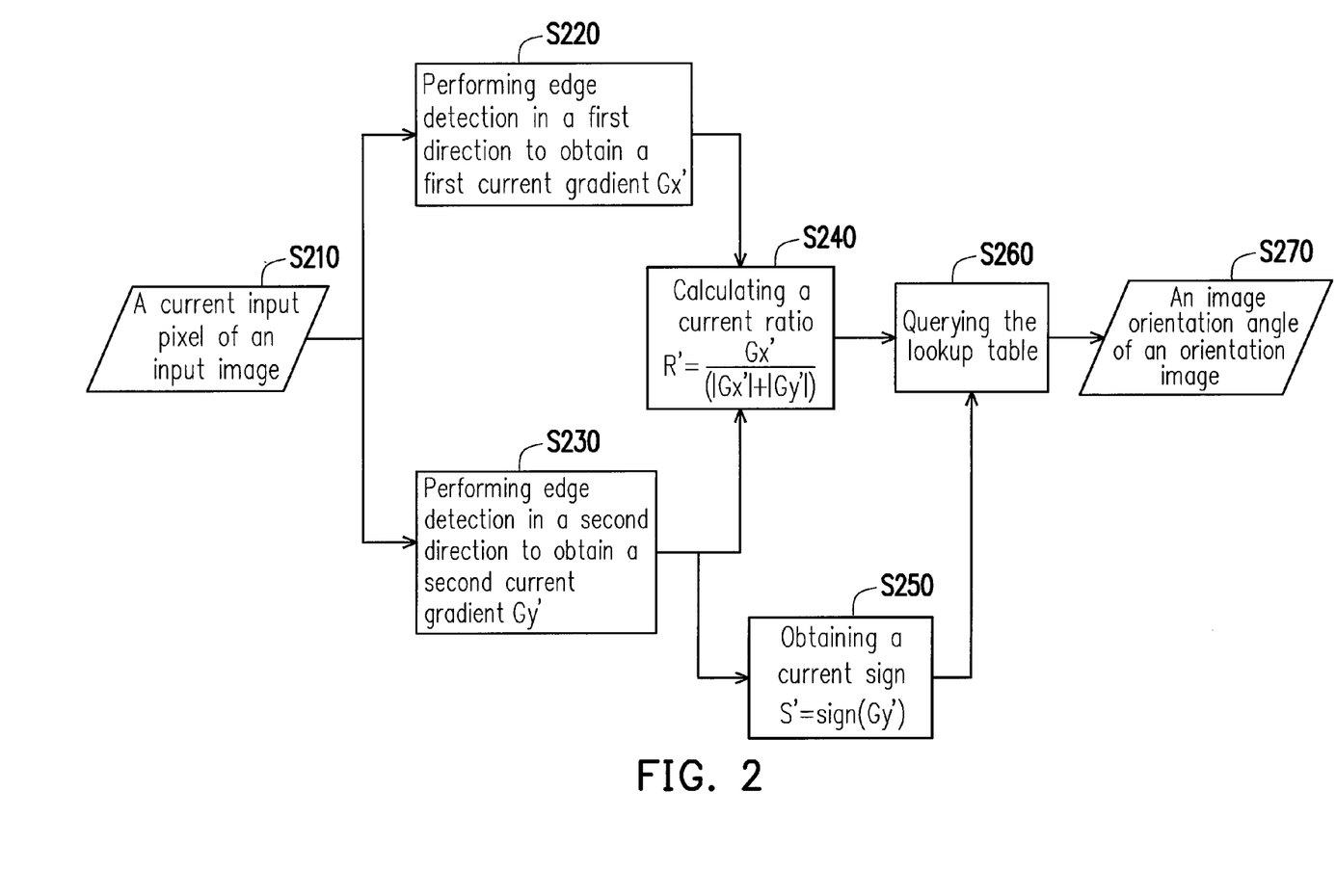
FIG. 2 illustrates a flowchart of a method for generating an orientation image according to the embodiment of FIG. 1.

FIG. 2 illustrates a flowchart of a method for generating an orientation image according to the embodiment of FIG. 1. The orientation image in the present embodiment includes a plurality of image orientation angles, where each of the image orientation angles ranges between 0 and $2\pi$ or between 0 and 360°. The method is adapted to an electronic device with an image processing feature such as a personal computer, a laptop computer, a digital camera, a digital camcorder, a web camera, a smart phone, a tabular computer, a vehicle event recorder, a vehicle video and audio system, and so forth. The invention is not limited herein. The lookup table constructed in the embodiment of FIG. 1 is prestored in the electronic device.

Referring to FIG. 2, a plurality of input pixels of an input image are received in Step S210, where the input pixels includes a current input pixel. The input pixels are arranged in a matrix with columns and rows. Since the processing step is the same for each of the input pixels, only the current input pixel among the input pixels would be illustrated hereinafter.

Next, in Step S220 and Step 230, edge detection is performed on the current input pixel in a first direction and a second direction so as to respectively generate a first current gradient and a second current gradient with respect to the first direction and the second direction. To be specific, gradients of the current pixel with respect to different directions may be calculated by using an edge detection filter. In the present embodiment, the first direction is orthogonal to the second direction. The first current gradient with respect to the first direction and the second current gradient with respect to the second direction are a horizontal gradient Gx' and a vertical gradient Gy' of the current input pixel respectively.

In Step S240, a ratio of the first current gradient to a current gradient absolute sum is calculated so as to obtain a current ratio, where the current gradient absolute sum is a sum of an absolute value of the first current gradient and an absolute value of the second current gradient, and the current ratio R' may be written as Eq. (2.1):

$$R' = \frac{Gx'}{(|Gx'| + |Gy'|)} \qquad \text{Eq. (2.1)}$$

In Step S250, a sign of the second current gradient is extracted so as to obtain a current sign, where the current sign S' may be written as Eq. (2.2):

$$S' = \text{sign}(Gy') \qquad \text{Eq. (2.2)}$$

Next, in Step S260, the current ratio and the current sign are input to the lookup table constructed in FIG. 1 so as to obtain the image orientation angle corresponding to the current input pixel, and the image orientation angle is output in Step S270. After all of the input pixels of the input image are processed, the orientation image ranging between 0 and $2\pi$ or between 0 and 360° would then be generated.

Figure 3:
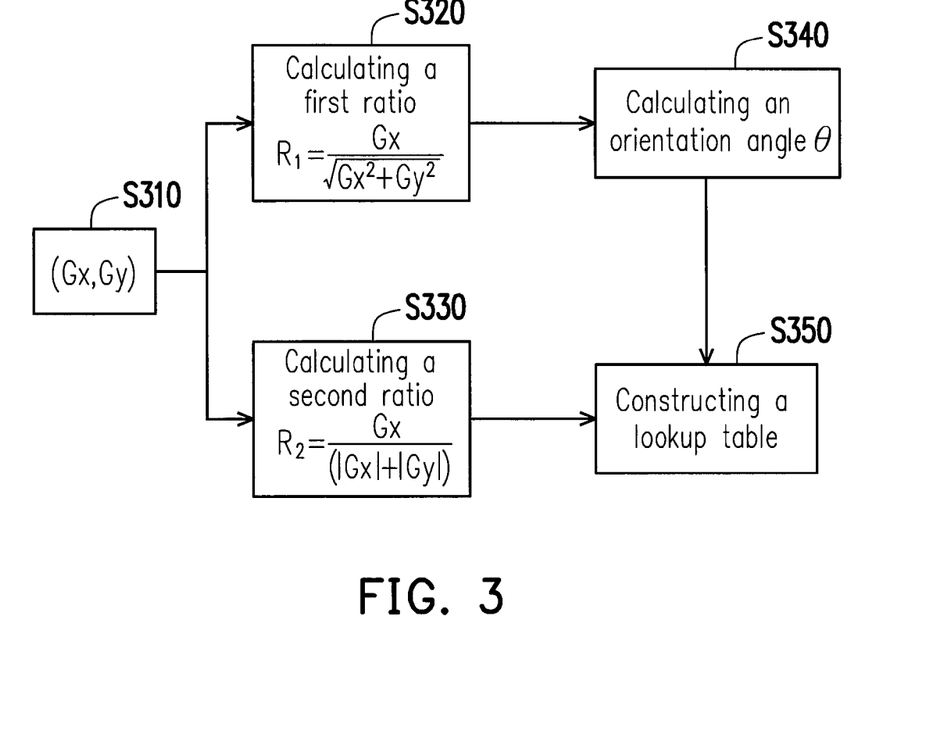
FIG. 3 illustrates a flowchart of another method for constructing a lookup table of an orientation image according to an embodiment of the invention.
Figure 4:
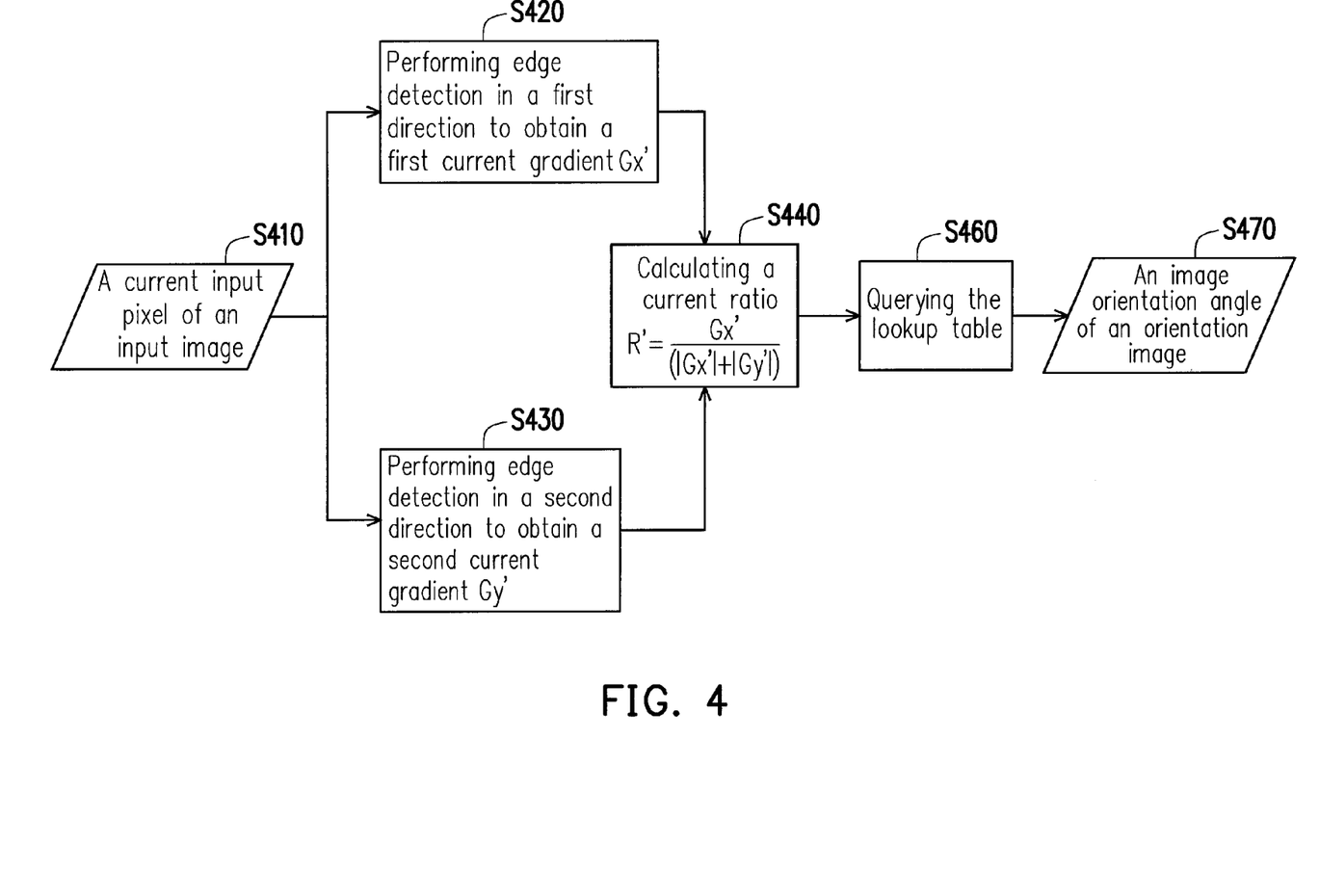
FIG. 4 illustrates a flowchart of a method for generating an orientation image according to the embodiment of FIG. 3.

FIG. 3 illustrates a flowchart of another method for constructing a lookup table of an orientation image according to an embodiment of the invention. FIG. 4 illustrates a flowchart of a method for generating an orientation image according to the embodiment of FIG. 3. The lookup table constructed in FIG. 3 is mathematically equivalent to an arcsine lookup table or an arccosine lookup table and is adapted to generate an orientation image with orientation angles ranging between 0 and π or between 0 and 180°. The steps illustrated in FIG. 3 and FIG. 4 are similar to those in FIG. 1 and FIG. 2, and thus only the difference would be described in detail.

Referring to FIG. 3, in Step S310, a plurality of first components with respect to a first direction and having positive signs, negative signs, and zeros as well as a plurality of second components with respect to a second direction and having positive signs, negative signs, and zeros are provided. In the present embodiment, the first direction is orthogonal to the second direction. In other words, each of the first components is a horizontal component Gx, and each of the second components is a vertical component Gy.

Next, the following steps may be performed on each set (Gx, Gy) formed by any one of the first components and any one of the second components. In Step S320, a first ratio corresponding to the first component is calculated, where the first ratio is equal to the first component divided by a square root of a sum of squares of the first component and the second component and may be written as Eq. (3.1):

$$R_1 = \frac{Gx}{\sqrt{Gx^2 + Gy^2}} \qquad \text{Eq. (3.1)}$$

where $R_1$ represents the first ratio. Since the lookup table in the present embodiment is adapted to generate an orientation image with orientation angles ranging between 0 and π or between 0 and 180°, a sign of the second component (i.e. the vertical component) is not associated with the construction of the lookup table. A sign extraction process similar to Step S130 would not be performed on the second component herein.

Moreover, in Step S330, a second ratio corresponding to the first component is calculated, where the second ratio is equal to the first component divided by a sum of an absolute value of the first component and an absolute value of the second component, and may be written as Eq. (3.2):

$$R_2 = \frac{Gx}{(|Gx| + |Gy|)} \qquad \text{Eq. (3.2)}$$

where $R_2$ represents the second ratio.

In Step S340, an orientation angle is calculated by using an arccosine function or an arcsine function according to the first ratio obtained in Step S320. Since the first ratio has a positive or negative sign, the orientation angle θ calculated herein may range between 0 and π or between 0 and 180°.

In Step S350, the lookup table is constructed according to the second ratio and the orientation angle computed in Step S340, where an input of the lookup table is the second ratio, and an output of the lookup table is the orientation angle. The lookup table constructed in Step S350 is mathematically equivalent to the arcsine lookup table constructed based on the first ratio and the orientation angle.

Next, referring to FIG. 4, the orientation image in the present embodiment includes a plurality of image orientation angles, where each of the image orientation angles ranges between 0 and π or between 0 and 180°. The method in the present embodiment is adapted to an electronic device similar to that in the embodiment of FIG. 2, and the lookup table constructed in the embodiment of FIG. 3 is prestored in the electronic device.

In Step S410, a plurality of input pixels of an input image are received in Step S410, where the input pixels includes a current input pixel. Similarly, since the processing step is the same for each of the input pixels, only the current input pixel among the input pixels would be illustrated hereinafter.

Next, in Step S420 and Step S430, edge detection is performed on the current input pixel in a first direction and a second direction so as to respectively generate a first current gradient and a second current gradient with respect to the first direction and the second direction. In the present embodiment, the first direction is orthogonal to the second direction. The first current gradient with respect to the first direction and the second current gradient with respect to the second direction are a horizontal gradient Gx' and a vertical gradient Gy' of the current input pixel respectively.

In Step S440, a ratio of the first current gradient to a current gradient absolute sum is calculated so as to obtain a current ratio, where the current gradient absolute sum is a sum of an absolute value of the first current gradient and an absolute value of the second current gradient, and the current ratio R' may be written as Eq. (4.1):

$$R' = \frac{Gx'}{(|Gx'| + |Gy'|)} \qquad \text{Eq. (4.1)}$$

Next, in Step S450, the current ratio computed in Step S440 is input to the lookup table constructed in FIG. 3 so as to obtain the image orientation angle corresponding to the current input pixel, and the image orientation angle is output in Step S460. After all of the input pixels of the input image are processed, the orientation image ranging between 0 and π or between 0 and 180° would then be generated.

Figure 5:
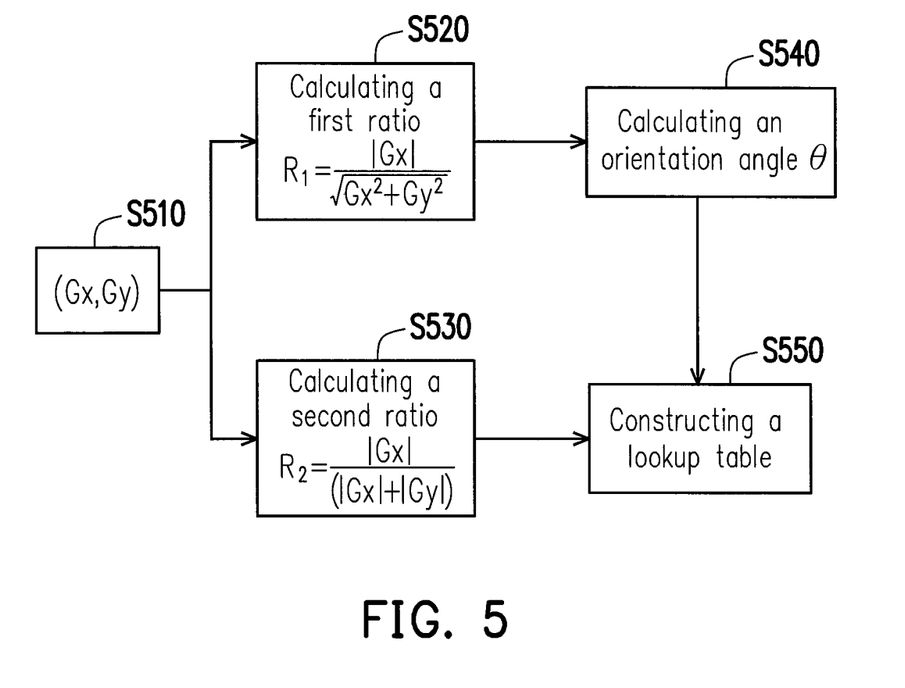
FIG. 5 illustrates a flowchart of another method for constructing a lookup table of an orientation image according to an embodiment of the invention.
Figure 6:
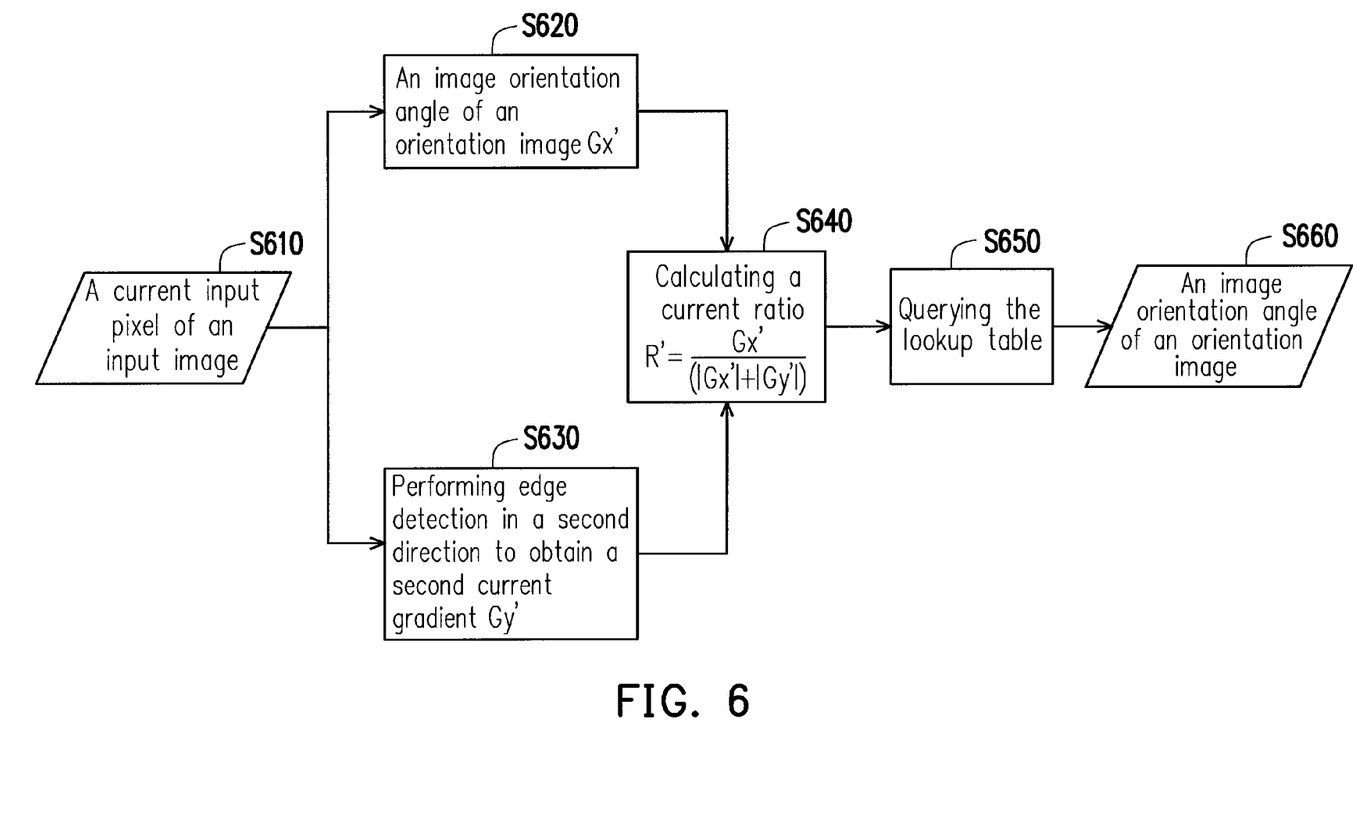
FIG. 6 illustrates a flowchart of a method for generating an orientation image according to the embodiment of FIG. 5.

FIG. 5 illustrates a flowchart of another method for constructing a lookup table of an orientation image according to an embodiment of the invention. FIG. 6 illustrates a flowchart of a method for generating an orientation image according to the embodiment of FIG. 5. The lookup table constructed in FIG. 5 is mathematically equivalent to an arcsine lookup table or an arccosine lookup table and is adapted to generate an orientation image with orientation angles ranging between 0 and π/4 or between 0 and 90°. The steps illustrated in FIG. 5 and FIG. 6 are similar to those in FIG. 1 and FIG. 2, and thus only the difference would be described in detail.

Referring to FIG. 5, in Step S510, a plurality of first components with respect to a first direction and having positive signs and zeros as well as a plurality of second components with respect to a second direction and having positive signs and zeros are provided. In the present embodiment, the first direction is orthogonal to the second direction. In other words, each of the first components is a horizontal component Gx, and each of the second components is a vertical component Gy.

Next, the following steps may be performed on each set (Gx, Gy) formed by any one of the first components and any one of the second components. In Step S520, a first ratio corresponding to the first component is calculated, where the first ratio is equal to the first component divided by a square root of a sum of squares of the first component and the second component and may be written as Eq. (5.1):

$$R_1 = \frac{|Gx|}{\sqrt{Gx^2 + Gy^2}} \qquad \text{Eq. (5.1)}$$

where $R_1$ represents the first ratio. Since the lookup table in the present embodiment is adapted to generate an orientation image with orientation angles ranging between 0 and π/4 or between 0 and 90°, the first component and the second component are positive or zeros. A sign extraction process similar to Step S130 would not be performed on the second component herein.

Moreover, a second ratio corresponding to the first component is calculated in Step S530, where the second ratio is equal to the first component divided by a sum of an absolute value of the first component and an absolute value of the second component and may be written as Eq. (5.2):

$$R_2 = \frac{|Gx|}{(|Gx|+|Gy|)} \quad \text{Eq. (5.2)}$$

where $R_2$ represents the second ratio.

In Step S540, an orientation angle is calculated by using an arccosine function or an arcsine function according to the first ratio obtained in Step S520. Since the first ratio is positive or zero, the orientation angle θ calculated herein may range between 0 and π/4 or between 0 and 90°.

In Step S550, the lookup table is constructed according to the second ratio and the orientation angle computed in Step S540, where an input of the lookup table is the second ratio, and an output of the lookup table is the orientation angle. The lookup table constructed in Step S550 is mathematically equivalent to the arcsine lookup table constructed based on the first ratio and the orientation angle.

Next, referring to FIG. 6, the orientation image in the present embodiment includes a plurality of image orientation angles, where each of the image orientation angles ranges between 0 and π/4 or between 0 and 90°. The method in the present embodiment is adapted to an electronic device similar to that in the embodiment of FIG. 2, and the lookup table constructed in the embodiment of FIG. 5 is prestored in the electronic device.

In Step S610, a plurality of input pixels of an input image are received, where the input pixels includes a current input pixel. Similarly, since the processing step is the same for each of the input pixels, only the current input pixel among the input pixels would be illustrated hereinafter.

Next, in Step S620 and Step S630, edge detection is performed on the current input pixel in a first direction and a second direction so as to respectively generate a first current gradient and a second current gradient with respect to the first direction and the second direction. In the present embodiment, the first direction is orthogonal to the second direction. The first current gradient with respect to the first direction and the second current gradient with respect to the second direction are a horizontal gradient Gx' and a vertical gradient Gy' of the current input pixel respectively.

In Step S640, a ratio of an absolute value of the first current gradient to a current gradient absolute sum is calculated so as to obtain a current ratio, where the current gradient absolute sum is a sum of an absolute value of the first current gradient and an absolute value of the second current gradient, and the current ratio R' may be written as Eq. (6.1):

$$R' = \frac{|Gx'|}{(|Gx'|+|Gy'|)} \quad \text{Eq. (6.1)}$$

Since the orientation angles of the orientation image to be generate in the present embodiment would range between 0 and π/4 or between 0 and 90°, the first current gradient is restricted to be positive.

Next, in Step S650, the current ratio computed in Step S640 is input to the lookup table constructed in FIG. 5 so as to obtain the image orientation angle corresponding to the current input pixel, and the image orientation angle is output in Step S660. After all of the input pixels of the input image are processed, the orientation image ranging between 0 and π/4 or between 0 and 90° would then be generated.

To sum up, in the method of the invention for generating an orientation image, a lookup table mathematically equivalent to an arcsine lookup table or an arccosine lookup table is prestored in an electronic device, where large memory space is not a requirement. After an input image is received and a first and a second current gradient of each input pixels are obtained through edge detection, a square-root and a square computation requiring high processing cost are replaced by an absolute computation, and an orientation image may be obtained by using the aforementioned lookup table. Accordingly, while generating a precise orientation image, the applicability of the technique proposed in the invention is increased in practical application especially for consumer electronic products integrated with a low-cost chip having a real-time computational capability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating an orientation image, adapted to an electronic device, wherein the orientation image comprises a plurality of image orientation angles, each of the image orientation angles ranges between 0 and 2π or between 0 and 360°, and wherein the method comprises:
    receiving a plurality of input pixels of an input image, wherein the input pixels comprises a current input pixel;
    performing edge detection on the current input pixel in a first direction and a second direction so as to respectively generate a first current gradient and a second current gradient with respect to the first direction and the second direction, wherein the first current gradient is a first component of a gradient of the current input pixel with respect to the first direction, and wherein the second current gradient is a second component of the gradient of the current input pixel with respect to the second direction;
    calculating a ratio of the first current gradient to a current gradient absolute sum so as to obtain a current ratio, wherein the current gradient absolute sum is a sum of an absolute value of the first current gradient and an absolute value of the second current gradient;
    extracting a sign of the second current gradient so as to obtain a current sign; and
    inputting the current ratio and the current sign to a lookup table so as to obtain the image orientation angle corresponding to the current input pixel, wherein the lookup table maps the current ratio and the current sign to an arccosine value or an arcsine value, and wherein the lookup table outputs an orientation angle corresponding to the arccosine value or the arcsine value.

2. The method according to claim 1, wherein the steps for constructing the lookup table comprise:
    providing a plurality of first components having positive signs, negative signs, and zeros as well as a plurality of second components having positive signs, negative signs, and zeros; and
    for each set formed by any one of the first components and any one of the second components:
        calculating a first ratio corresponding to the first component, wherein the first ratio is equal to the first component divided by a square root of a sum of squares of the first component and the second component;

extracting a sign of the second component so as to obtain a reference sign;

calculating an orientation angle by using an arccosine function or an arcsine function according to the first ratio and the reference sign, wherein the orientation angle ranges between 0 and $2\pi$ or between 0 and 360°;

calculating a second ratio corresponding to the first component, wherein the second ratio is equal to the first component divided by a sum of an absolute value of the first component and an absolute value of the second component; and constructing the lookup table according to the second ratio, the reference sign, and the orientation angle, wherein inputs of the lookup table are the second ratio and the reference sign, and wherein an output of the lookup table is the orientation angle.

3. The method according to claim 2, wherein the first direction is orthogonal to the second direction.

4. A method for generating an orientation image, adapted to an electronic device, wherein the orientation image comprises a plurality of image orientation angles, each of the image orientation angles ranges between 0 and $\pi$ or between 0 and 180°, and wherein the method comprises:

receiving a plurality of input pixels of an input image, wherein the input pixels comprises a current input pixel;

performing edge detection on the current input pixel in a first direction and a second direction so as to respectively generate a first current gradient and a second current gradient with respect to the first direction and the second direction, wherein the first current gradient is a first component of a gradient of the current input pixel with respect to the first direction, and wherein the second current gradient is a second component of the gradient of the current input pixel with respect to the second direction;

calculating a ratio of the first current gradient to a current gradient absolute sum so as to obtain a current ratio, wherein the current gradient absolute sum is a sum of an absolute value of the first current gradient and an absolute value of the second current gradient; and inputting the current ratio to a lookup table so as to obtain the image orientation angle corresponding to the current input pixel, wherein the lookup table maps the current ratio and the current sign to an arccosine value or an arcsine value, and wherein the lookup table outputs an orientation angle corresponding to the arccosine value or the arcsine value.

5. The method according to claim 4, wherein the steps for constructing the lookup table comprise:

providing a plurality of first components having positive signs, negative signs, and zeros as well as a plurality of second components having positive signs, negative signs, and zeros; and for each set formed by any one of the first components and any one of the second components:

calculating a first ratio corresponding to the first component, wherein the first ratio is equal to the first component divided by a square root of a sum of squares of the first component and the second component;

calculating an orientation angle by using an arccosine function or an arcsine function according to the first ratio, wherein the orientation angle ranges between 0 and $\pi$ or between 0 and 180°;

calculating a second ratio corresponding to the first component, wherein the second ratio is equal to the first component divided by a sum of an absolute value of the first component and an absolute value of the second component; and constructing the lookup table according to the second ratio and the orientation angle, wherein an input of the lookup table is the second ratio, and wherein an output of the lookup table is the orientation angle.

6. The method according to claim 5, wherein the first direction is orthogonal to the second direction.

7. A method for generating an orientation image, adapted to an electronic device, wherein the orientation image comprises a plurality of image orientation angles, each of the image orientation angles ranges between 0 and $\pi/4$ or between 0 and 90°, and wherein the method comprises:

receiving a plurality of input pixels of an input image, wherein the input pixels comprises a current input pixel;

performing edge detection on the current input pixel in a first direction and a second direction so as to respectively generate a first current gradient and a second current gradient with respect to the first direction and the second direction, wherein the first current gradient is a first component of a gradient of the current input pixel with respect to the first direction, and wherein the second current gradient is a second component of the gradient of the current input pixel with respect to the second direction;

calculating a ratio of an absolute value of the first current gradient to a current gradient absolute sum so as to obtain a current ratio, wherein the current gradient absolute sum is a sum of an absolute value of the first current gradient and an absolute value of the second current gradient; and inputting the current ratio to a lookup table so as to obtain the image orientation angle corresponding to the current input pixel, wherein the lookup table maps the current ratio and the current sign to an arccosine value or an arcsine value, and wherein the lookup table outputs an orientation angle corresponding to the arccosine value or the arcsine value.

8. The method according to claim 7, wherein the steps for constructing the lookup table comprise:

providing a plurality of first components having positive signs and zeros as well as a plurality of second components having positive signs and zeros; and for each set formed by any one of the first components and any one of the second components:

calculating a first ratio corresponding to the first component, wherein the first ratio is equal to the first component divided by a square root of a sum of squares of the first component and the second component;

calculating an orientation angle by using an arccosine function or an arcsine function according to the first ratio, wherein the orientation angle ranges between 0 and $\pi/4$ or between 0 and 90°;

calculating a second ratio corresponding to the first component, wherein the second ratio is equal to the first component divided by a sum of a value of the first component and a value of the second component; and constructing the lookup table according to the second ratio and the orientation angle, wherein an input of the lookup table is the second ratio, and wherein an output of the lookup table is the orientation angle.

9. The method according to claim 8, wherein the first direction is orthogonal to the second direction.

* * * * *